Patented Nov. 7, 1939

2,178,793

UNITED STATES PATENT OFFICE 2,178,793

DYESTUFFS OF THE NAPHTHOPHENO-SAFRANINE SERIES

Eugen Huber, Leverkusen-I. G. Werk, Germany, assignor to General Aniline Works, Inc., New York, N. Y., a corporation of Delaware No Drawing. Application March 27, 1936, Serial No. 71,311. In Germany March 29, 1935

7 Claims. (Cl. 260—266)

The present invention relates to new acid dyestuffs of the naphthophenosafranine series and to a process for the manufacture of the said dyestuffs, more particularly it relates to dyestuffs which may be represented by the probable general formula:

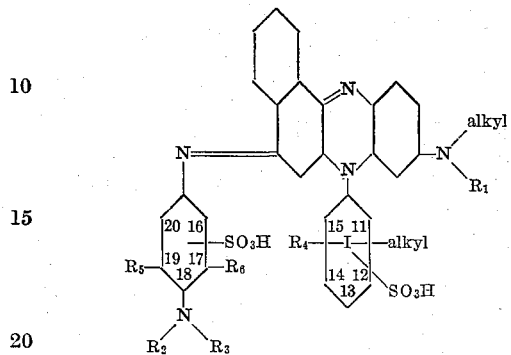

In the said formula $R_1$ means alkyl or hydroaryl, $R_2$ and $R_3$ mean the same or different members selected from the group consisting of hydrogen, alkyl, aralkyl and hydroaryl, and $R_4$, $R_5$ and $R_6$ mean the same or different members selected from the group consisting of hydrogen, alkyl, alkoxy and halogen.

It is known from experience that it is only very difficultly possible to obtain, by sulfonating in the usual manner, sufficiently soluble dyestuffs from naphthophenosafranines which do not contain as substituents groups capable of being sulfonated, such as phenyl or benzyl radicals. In order to obtain a sufficient solubility, it is necessary to apply very energetic sulfonating conditions, and in such cases very dull products are obtained, which are useless for technical purposes.

In accordance with the present invention naphthophenosafranines which do not contain as substituents groups capable of being sulfonated, such as benzyl or phenyl radicals, can be easily sulfonated to useful and readily soluble azine dyestuffs of good clearness, when the nucleus I of the first formula below is substituted, in a suitable manner, by groups which are themselves not capable of being sulfonated.

The process of manufacture according to the present invention is by sulfonating dyestuffs of the following general formula:

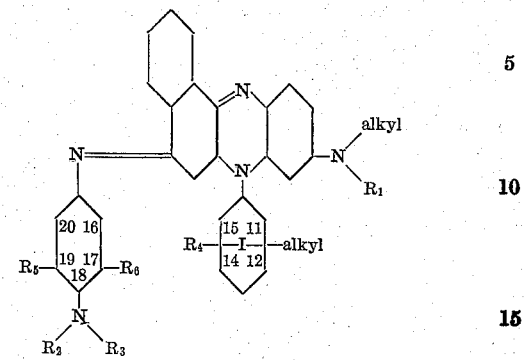

in which $R_1$ means alkyl or hydroaryl, $R_2$ and/or $R_3$ mean hydrogen, alkyl or hydroaryl, $R_4$, $R_5$ and $R_6$ mean hydrogen, alkyl, alkoxy or halogen, and the nucleus I contains at least one alkyl group. Particularly good results are obtained, when both the o-positions to the azine nitrogen are substituted by alkyl radicals. In cases where a free amino group is present in 18-position, it is advantageous that at least one of the two o-positions to this amino group be substituted by an alkyl radical.

The sulfonation of the starting basic dyestuffs is performed in the usual manner, f. i. by introducing the basic dyestuff into oleum, for example an oleum containing 30-40% of $SO_3$, and sulfonating at temperatures, say between about 50° and about 100° C., until a test portion is clearly soluble in aqueous sodium acetate solution. Depending upon the different starting dyestuffs the process is complete between about 2 and about 6 hours.

The basic naphthophenosafranines specified as starting materials can be obtained from isorosindulines or isorosinduline-6-sulfonic acid and p-phenylenediamines (for instance, according to British Patent No. 24,410/1897 and U. S. Patent No. 617,703).

The dyestuffs obtained according to this process are distinguished by remarkable clear blue shades. They are readily soluble and in general have a good equalizing capacity.

In cases where the amino group in 18-position is either unsubstituted or only mono-substituted, the dyestuffs can be aftertreated with an alkylating, aralkylating, or acylating agent. Thus, for instance, by after-treatment of the sulfonated dyestuffs with benzyl chloride, dyestuffs of a remarkable fastness to washing, fulling and sea water are obtained.

The invention is illustrated by the following examples, but is not restricted thereto:

*Example 1.*—The phenonaphthosafranine of the formula:

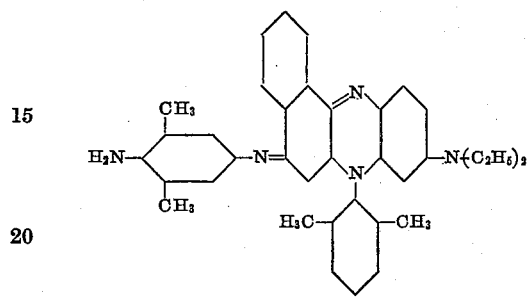

is introduced, for sulfonation, into five times the quantity of fuming sulfuric acid of 30% strength, and heated at 80° C., during several hours, until a test portion is soluble to a clear solution in an aqueous solution of sodium acetate. The sulfonic groups probably enter the 12- and 16-positions. The working up is effected by pouring on ice, filtration, and converting into the sodium salt. The dyestuffs obtained dyes wool very clear greenish blue shades of good fastness to light and alkalies.

By heating with benzyl chloride, in an aqueous or dilute alcoholic solution, in the presence of sodium acetate, the amino group in the 18-position is benzylated, whereby an excellent fastness to sea water is obtained. The dyestuff probably corresponds to the following formula:

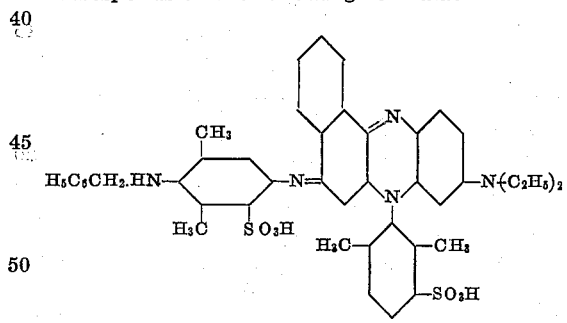

*Example 2.*—In an analogous manner to that described in Example 1 the dyestuff of the formula:

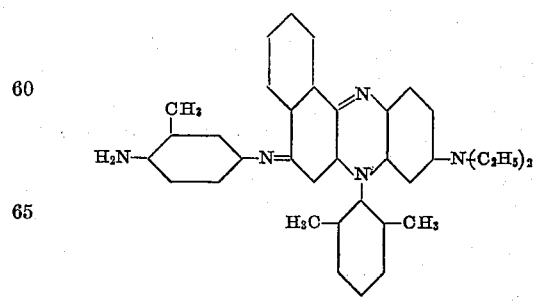

is sulfonated. Probably the sulfonic acid groups enter the 12- and 16-positions. The dyestuff dyes wool clear and somewhat more reddish shades than the dyestuff obtained according to the Example 1. It has likewise good fastness properties.

In an analogous manner there has been prepared the dyestuff of the following constitution:

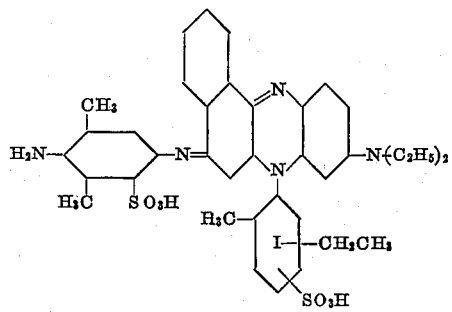

and the dyestuff of the following constitution:

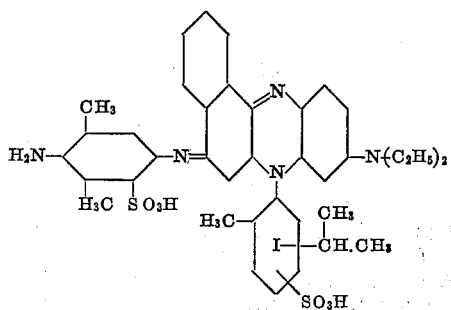

which dye wool greenish blue shades. The positions of the ethyl or isopropyl group, respectively, in the nucleus I are not exactly known; in the manufacture of the starting naphthophenosafranine there has been used as component ethyl- or isopropylaniline, respectively, which has been prepared by nitrating ethylbenzene or isopropylbenzene, respectively, followed by reduction.

*Example 3.*—In an analogous manner to that described in Example 1, the dyestuff of the following formula:

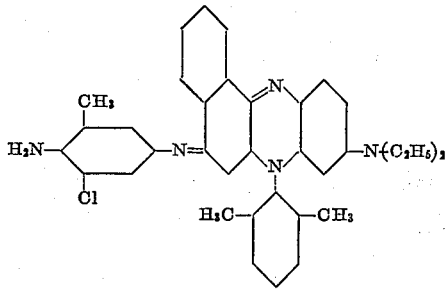

is sulfonated. Probably the sulfonic acid groups enter the 12- and 16-positions. The dyestuff obtained directly and also that obtained after benzylation have a great similarity to the products obtained according to the Example 1.

*Example 4.*—For sulfonation, the dyestuff of the formula:

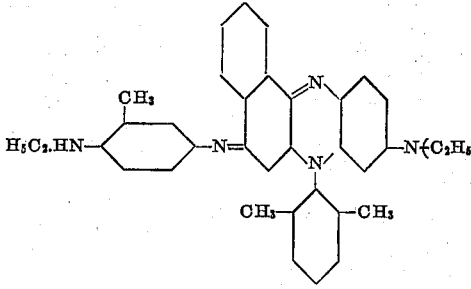

is heated at 80° C., during several hours, with five times the quantity of fuming sulfuric acid, until a test portion dissolves in a dilute sodium acetate solution without a residue. The working-up and conversion into the sodium salt are effected in the usual manner. The dyestuff dissolves with a green coloration in concentrated sulfuric acid, with a blue coloration in water, and dyes wool clear and greenish blue shades of good fastness to light and alkalies. It has a good equalizing capacity. The dyestuff has probably the following formula:

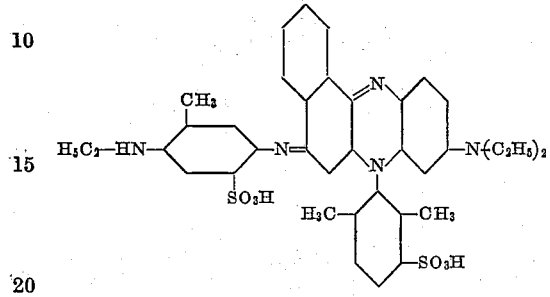

*Example 5.*—The dyestuff obtained in an analogous manner to that described in Example 4, which has probably the formula:

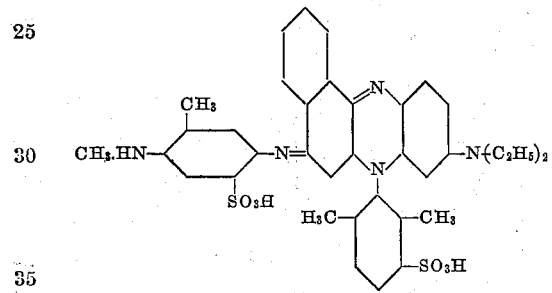

dyes wool somewhat more reddish shades of equal fastness properties.

*Example 6.*—In an analogous manner to that indicated in Example 4, a dyestuff which probably has the constitution:

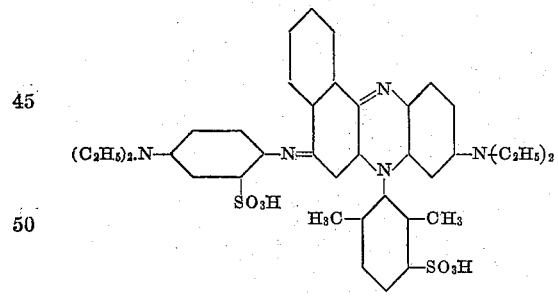

is obtained. It dyes wool blue shades which are not quite so clear as those of the dyestuffs of the preceding examples, but have good fastness to light and alkalies.

*Example 7.*—In an analogous manner to that described in Example 4, the dyestuff probably of the formula:

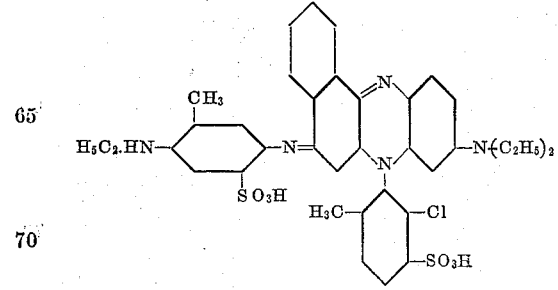

is obtained. It dyes wool clear greenish blue shades of good fastness to light and alkalies and has a good equalizing capacity.

*Example 8.*—The dyestuff probably of the formula:

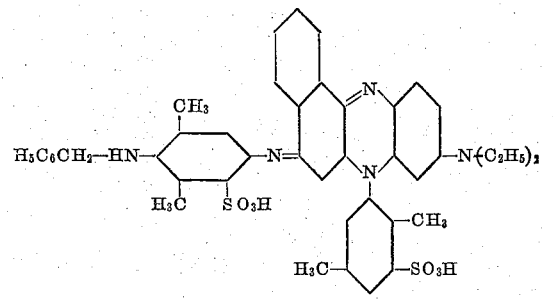

manufactured in an analogous manner to that described in Example 1, by sulfonating and benzylating, dissolves with a green coloration in concentrated sulfuric acid, in water with a clear greenish blue coloration, and dyes wool clear and greenish blue shades of good fastness to light, alkalies, washing, and sea water.

Instead of the benzyl radical, with the same success, the 2-chloro- or 2.4-dichloro-benzyl radical may be introduced.

*Example 9.*—The dyestuff probably of the formula:

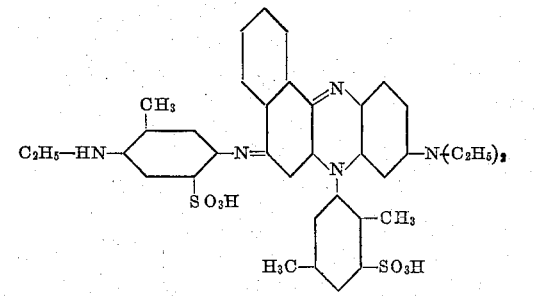

manufactured in an analogous manner to that described in Example 4, dissolves with a green coloration in concentrated sulfuric acid, with a blue coloration in water, and dyes wool clear and greenish blue shades of good fastness to light and alkalies and of a good equalizing capacity.

*Example 10.*—The dyestuff probably of the formula:

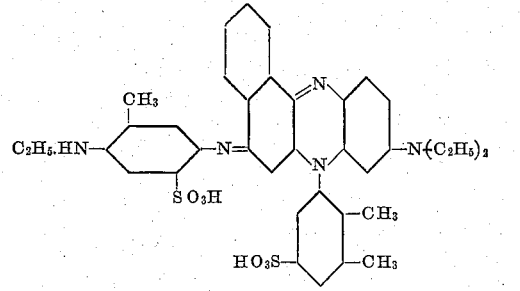

manufactured in a similar manner to that described in Example 9, has similar properties to the dyestuff of Example 9.

*Example 11.*—The dyestuff probably of the formula:

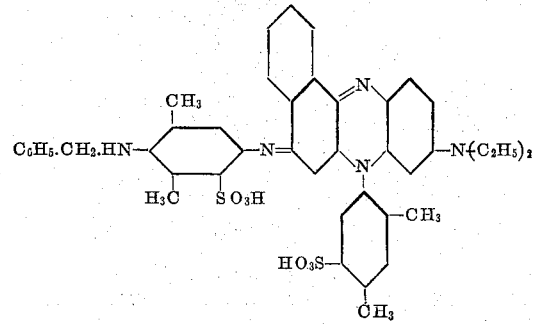

manufactured in an analogous manner to that described in Example 1, by sulphonating and benzylating, dyes wool somewhat more reddish blue shades of otherwise similar properties.

*Example 12.*—The isorosinduline from vic. m-xylyl-β-naphthylamine and nitrosodimethyl aniline is oxidized together with 5-amino-2-methyl-toluidine, and the safranine obtained is sulfonated according to the directions of Example 4. It dyes wool somewhat more reddish shades than the dyestuff of Example 4 but otherwise possesses the same good properties.

The dyestuff obtained has probably the following formula:

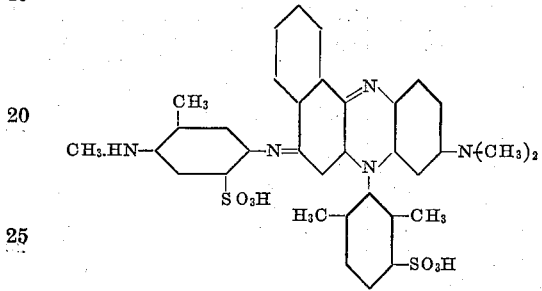

*Example 13.*—The dyestuff probably of the formula:

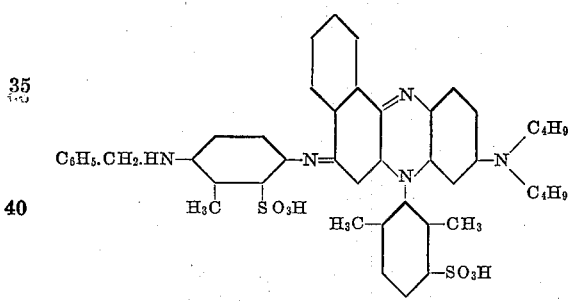

is manufactured in a similar manner to the dyestuff described in Example 1. It is equal to the dyestuff of Example 1 in shade and properties.

*Example 14.*—In an analogous manner to that described in Example 1, the dyestuff probably of the formula:

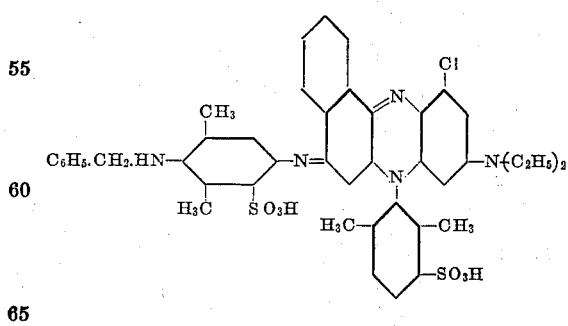

is obtained. It has similar properties to the dyestuff described in Example 13.

*Example 15.*—The isorosinduline obtained, in an analogous manner to that described in Example 4, from o-tolyl-β-naphthylamine and nitrosodibutylaniline is oxidized together with xylylene-diamine, and the safranine obtained is sulfonated in the known manner. The dyestuff obtained dyes wool clear and blue shades of good fastness to alkalies, light and washing. It has probably the formula:

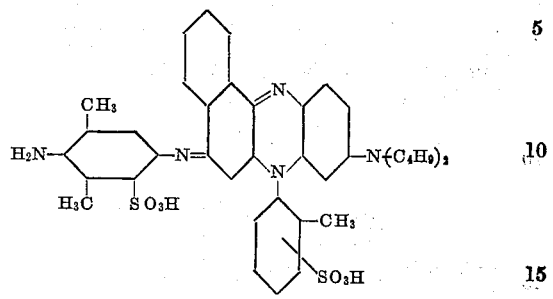

*Example 16.*—The isorosinduline obtained from vic. m-xylyl-β-naphthylamine and nitroso-cyclohexyl-ethylaniline is oxidized together with xylylene diamine, and the safranine obtained is sulfonated in the known manner.

The dyestuff obtained, probably of the formula:

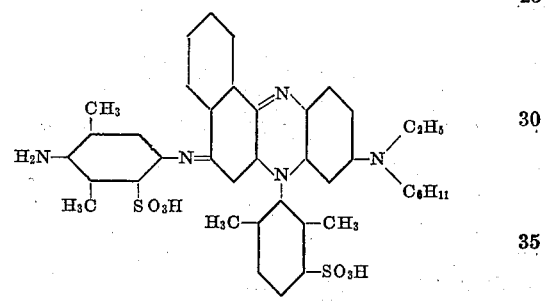

dyes wool reddish blue shades of good fastness to alkalies and light.

*Example 17.*—The isorosinduline obtained in an analogous manner to that described in Example 4, from p-xylyl-β-naphthylamine and nitrosodiethylaniline is oxidized with 5-aminocyclohexyl-2-toluidine, and the dyestuff obtained is sulfonated. It dissolves with a green coloration in concentrated sulfuric acid, with a clear greenish blue coloration in water, and dyes wool clear and blue shades of good fastness to light, alkalies and washing.

The dyestuff probably has the formula:

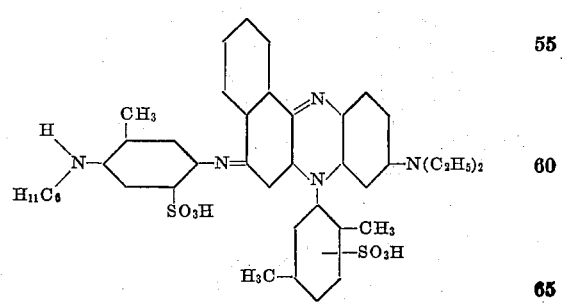

*Example 18.*—The isorosinduline obtained from m-tolyl-β-naphthylamine and nitroso-diethylaniline is converted with bisulfite into the 6-monosulfonic acid, and the latter is treated in a diluted alcoholic solution with xylylenediamine. The basic safranine thus obtained is sulfonated by heating during several hours with five parts of fuming sulfuric acid of 32% strength.

The dyestuff probably has the formula:

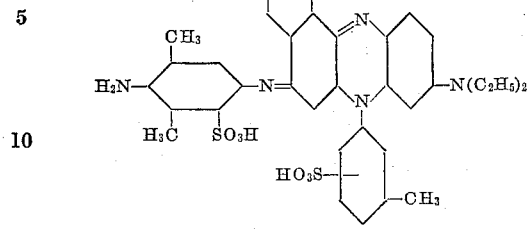

It dissolves with a green coloration in concentrated sulfuric acid, with a blue coloration in water, and dyes wool blue shades of good fastness properties.

Example 19.—The dyestuff of the formula:

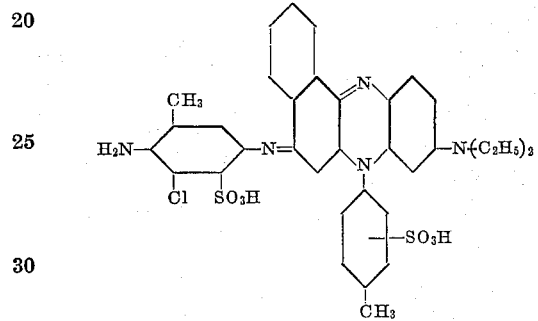

has similar properties to the dyestuff obtained according to Example 18.

Example 20.—The isorosinduline obtained from 6 - methoxy -3- methylphenyl -β- naphthylamine gives by oxidizing together with xylylenediamine and subsequent sulfonation, in an analogous manner to that described in Example 1, a dyestuff probably of the constitution:

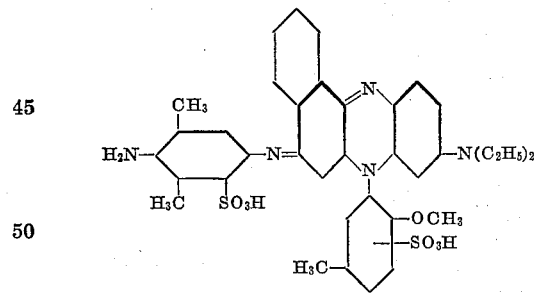

It dissolves with a greenish coloration in concentrated sulfuric acid, with a blue coloration in water, and dyes wool reddish blue shades of good fastness properties.

I claim:

1. The process which comprises sulfonating a dyestuff of the following general formula:

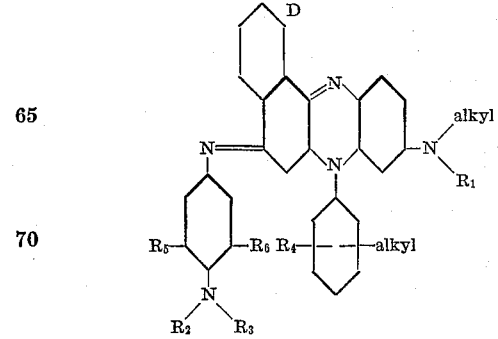

wherein $R_1$ means a member of the group consisting of alkyl and cyclohexyl, $R_2$ and $R_3$ mean the same or different members selected from the group consisting of hydrogen, alkyl and cyclohexyl, and $R_4$, $R_5$ and $R_6$ mean the same or different members selected from the group consisting of hydrogen, alkyl, alkoxy and halogen, until a test portion is soluble in aqueous sodium acetate solution.

2. The process which comprises sulfonating a dyestuff of the following general formula:

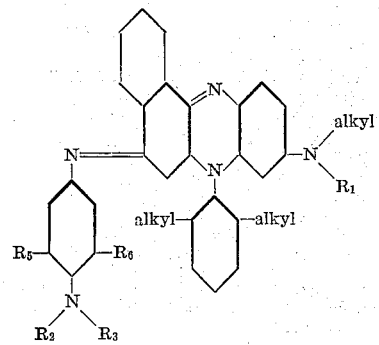

wherein $R_1$ means a member of the group consisting of alkyl and cyclohexyl, $R_2$ and $R_3$ mean the same or different members selected from the group consisting of hydrogen, alkyl and cyclohexyl, and $R_5$ and $R_6$ mean the same or different members selected from the group consisting of hydrogen, alkyl, alkoxy and halogen, until a test portion is soluble in aqueous sodium acetate solution.

3. The process which comprises sulfonating the dyestuff of the following formula:

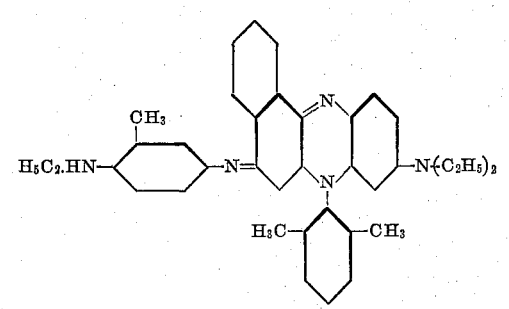

until a test portion is soluble in aqueous sodium acetate solution.

4. The process which comprises sulfonating the dyestuff of the following formula:

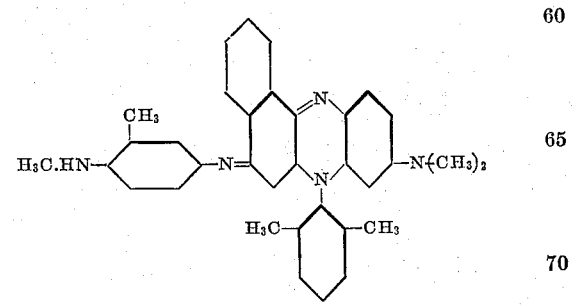

until a test portion is soluble in aqueous sodium acetate solution.

5. The dyestuff having in its free state the following formula:

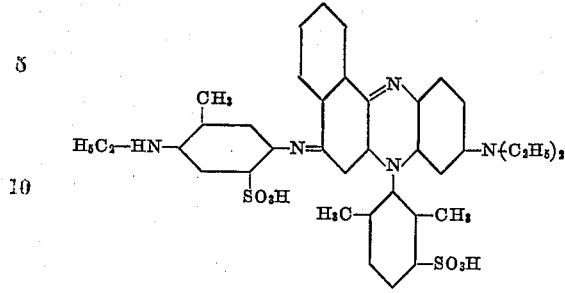

dyeing wool clear greenish blue shades of good fastness to light and alkalies.

6. The dyestuff having in its free state the following formula:

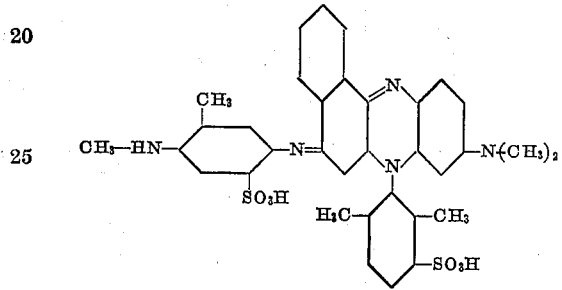

dyeing wool clear blue shades of good fastness to light and alkalies.

7. Dyestuffs having in the free state the general formula

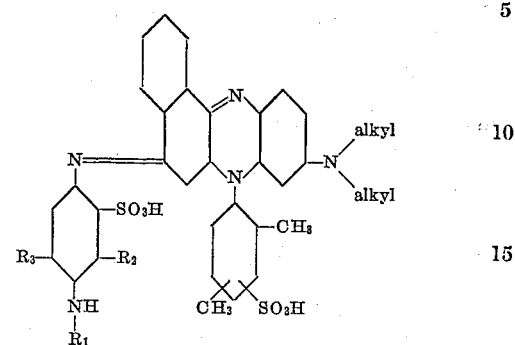

wherein $R_1$ stands for a member of the group consisting of hydrogen, alkyl and aralkyl, and $R_2$ and $R_3$ mean the same or different members selected from the group consisting of hydrogen and methyl, yielding on animal fibers in general clear blue shades.

EUGEN HUBER.